US009229956B2

(12) United States Patent
Ke et al.

(10) Patent No.: US 9,229,956 B2
(45) Date of Patent: Jan. 5, 2016

(54) IMAGE RETRIEVAL USING DISCRIMINATIVE VISUAL FEATURES

(75) Inventors: Qifa Ke, Cupertino, CA (US); Jia Deng, Mountain View, CA (US); Simon Baker, Los Altos, CA (US); Michael Isard, San Francisco, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 596 days.

(21) Appl. No.: 12/987,167

(22) Filed: Jan. 10, 2011

(65) Prior Publication Data

US 2012/0177294 A1 Jul. 12, 2012

(51) Int. Cl.
G06K 9/54 (2006.01)
G06F 17/30 (2006.01)

(52) U.S. Cl.
CPC .... G06F 17/30256 (2013.01); G06F 17/30277 (2013.01)

(58) Field of Classification Search
None
See application file for complete search history.

(56) References Cited

U.S. PATENT DOCUMENTS

| 6,507,841 | B2* | 1/2003 | Riverieulx de Varax | |
| 6,625,317 | B1 | 9/2003 | Gaffin et al. | |
| 6,792,434 | B2* | 9/2004 | Moghaddam et al. | |
| 6,850,644 | B1* | 2/2005 | Shin et al. | 382/190 |
| 8,437,558 | B1* | 5/2013 | Medasani et al. | 382/225 |
| 8,520,949 | B1* | 8/2013 | Bissacco et al. | 382/190 |
| 2003/0231806 | A1* | 12/2003 | Troyanker | 382/305 |
| 2005/0225678 | A1* | 10/2005 | Zisserman et al. | 348/571 |
| 2005/0262067 | A1* | 11/2005 | Lee et al. | 707/3 |
| 2006/0261157 | A1* | 11/2006 | Ostrowski et al. | 235/383 |
| 2007/0112850 | A1* | 5/2007 | Flynn et al. | 707/104.1 |
| 2007/0214172 | A1* | 9/2007 | Nister et al. | 707/102 |
| 2007/0239778 | A1* | 10/2007 | Gallagher | 707/104.1 |
| 2008/0205795 | A1 | 8/2008 | Marques et al. | |
| 2009/0015676 | A1 | 1/2009 | Ke et al. | |
| 2009/0016604 | A1* | 1/2009 | Ke et al. | 382/176 |
| 2009/0259633 | A1* | 10/2009 | Bronstein et al. | 707/3 |
| 2009/0282025 | A1* | 11/2009 | Winter et al. | 707/5 |
| 2010/0017389 | A1 | 1/2010 | Ogunbona et al. | |

(Continued)

OTHER PUBLICATIONS

Herve Jegou; Hedi Harzallah; Cordelia Schmid, "A contextual dissimilarity measure for accurate and efficient image search", (Jun. 17, 2007), In Computer Vision and Pattern Recognition 2007, pp. 1-8.*

(Continued)

*Primary Examiner* — Sumati Lefkowitz
*Assistant Examiner* — Carol Wang
(74) *Attorney, Agent, or Firm* — Sandy Swain; Steve Wight; Micky Minhas (57) ABSTRACT

Image search results are obtained by providing weights to visual features to emphasize features corresponding to objects of interest while simultaneously deemphasizing irrelevant or inconsistent features that lead to poor search results. In order to minimize the impact of visual features that are unreliable or irrelevant with respect to the objects of interest in the image, context-dependent weights are provided to detect visual features such that those visual features pertaining to the objects of interest are more heavily weighted than those visual features that pertain to irrelevant or unreliable portions of the image. Visual features may be weighted for images in a searchable database. Training data may be obtained and used in weighting visual features in a query image and, alternatively, in searchable database images.

20 Claims, 4 Drawing Sheets

(56) References Cited

U.S. PATENT DOCUMENTS

| | | | |
|---|---|---|---|
| 2010/0034464 A1 | 2/2010 | Ito et al. | |
| 2010/0088295 A1* | 4/2010 | Duan et al. | 707/705 |
| 2010/0177967 A1 | 7/2010 | Lee et al. | |
| 2010/0189354 A1 | 7/2010 | de Campos et al. | |
| 2010/0195914 A1* | 8/2010 | Isard et al. | 382/201 |
| 2010/0226564 A1 | 9/2010 | Marchesotti et al. | |
| 2010/0260401 A1 | 10/2010 | Spitzer et al. | |
| 2012/0045132 A1* | 2/2012 | Wong et al. | 382/195 |

OTHER PUBLICATIONS

Josef Sivic; Andrew Zisserman, "Video Google: A text retrieval approach to object matching in videos", (Oct. 13, 2003), In Proceedings of Ninth IEEE International Conference on Computer Vision, pp. 1470-1477.*

Ondrej Chum; James Philbin; Andrew Zisserman, "Near duplicate image detection: min-hash and tf-idf weighting", 2008, In Proceedings of the British Machine Vision Conference, vol. 3, p. 4.*

Jun Yang; Yu-Gang Jiang; Alexander G. Hauptmann; Chong-Wah Ngo, "Evaluating bag-of-visual-words representations in scene classification", 2007, In Proceedings of the international workshop on Workshop on multimedia information retrieval, pp. 197-206.*

Zhong Wu; Qifa Ke; Jian Sun; Heung-Yeung Shum, "A multi-sample, multi-tree approach to bag-of-words image representation for image retrieval", (Sep. 29, 2009), In 2009 IEEE 12th International Conference on Computer Vision, pp. 1992-1999.*

Zhong Wu; Qifa Ke; Michael Isard; Jian Sun, "Bundling features for large scale partial-duplicate web image search", (Jun. 20, 2009), In IEEE Conference on Computer Vision and Pattern Recognition, pp. 25-32.*

Brian Tomasik, Phyo Thiha, Douglas Turnball, Tagging Products using Image Classification, Jul. 2009, Swarthmore College, Technical report.*

Sivic, Josef, and Andrew Zisserman. "Efficient visual search of videos cast as text retrieval." Pattern Analysis and Machine Intelligence, IEEE Transactions on 31, No. 4 (2009): 591-606.*

Jiang, Yu-Gang, Chong-Wah Ngo, and Jun Yang. "Towards optimal bag-of-features for object categorization and semantic video retrieval." In Proceedings of the 6th ACM international conference on Image and video retrieval, pp. 494-501. ACM, 2007.*

Deselaers, et al., "Features for Image Retrieval: An Experimental Comparison", Retrieved at <<http://citeseerx.ist.psu.edu/viewdoc/download?doi=10.1.1.117.2100&rep=rep1&type=pdf>> Nov. 29, 2007, pp. 1-22.

Hu, et al., "Investigating Visual Feature Extraction Methods for Image Annotation", Retrieved at <<http://ieeexplore.ieee.org/stamp/stamp.jsp?arnumber=05346144>> In the proceedings of the 2009 IEEE International Conference on Systems, Man, and Cybernetics, Oct. 2009, pp. 3122-3127.

* cited by examiner

*FIG. 6*

IMAGE RETRIEVAL USING DISCRIMINATIVE VISUAL FEATURES

BACKGROUND

In many applications, such as in the context of web-based search engine image queries, brute-force methods of comparing entire query images against entire stored images to find appropriate matches is prohibitively inefficient and computationally over-expensive. For this reason, current frameworks for two-dimensional image searching instead process the query image and stored database images to find matches using various feature detection schemes that quantize such images as "bags of visual features."

In content-based image retrieval, an image may be represented as a bag of visual features—that is, an image file can be viewed as a "bag" (an unsorted container) filled with visual features such as edges, corners, blobs, and so forth. These individual features found in an image may correspond to individual features in an index of known visual features, akin to how individual words extracted from a novel may correspond to individual words found in a dictionary. Of course, an individual feature from an image may not have a perfect visual match in the database—just like a handwritten word may not look like its equivalent typeset word in a dictionary—but analogous to how the human eye and mind can match a handwritten word to a typeset word, visual features can be closely matched to corresponding entries in a visual feature database using a combination of techniques for feature detection, feature description, and feature book generation (described below). Once the visual features of an image have been identified and counted—again, like the words in a novel being individually identified and tallied—the image as a whole can be quantified based on, for example, a histogram representation of its independent visual features that is then compared to other images (with their own representations of their independent visual features) to identify those images with sufficiently similar histogram representations. In this way, a bag of visual features corresponding to an image may serve as the basic element for processing that image in a content-based retrieval context.

However, with regard to image retrieval and recognition, many visual features detected in an image are often not reliable or are irrelevant to the objects of interest found in an image, and the inclusion of such non-relevant visual features can reduce retrieval performance. This is particularly relevant when there exists an object of interest in the image that is of paramount importance to image matching, which is often the case in the context of web-based image searching. For example, given an image of a prominent foreground object such as a building, the features of a tree in the background of the image may in fact degrade the performance of image recognition and retrieval. Similarly, some visual features from highly textured regions may not be repeatable—that is, such features may change with small disturbances due to camera viewpoint or image 'noise'—and thus these visual features would hinder, not help, in the image recognition and retrieval process. While some common approaches may utilize simple weighting schemes—such as those based on visual-word-counts such as term-frequency inverse-document-frequency (TFIDF)—these approaches do not effectively reduce the impact of irrelevant or unreliable image features.

SUMMARY

Image search results are obtained by providing weights to visual features to emphasize features corresponding to objects of interest while simultaneously deemphasizing irrelevant or inconsistent features that lead to poor search results. In order to minimize the impact of visual features that are unreliable or irrelevant with respect to the objects of interest in the image, context-dependent weights are provided to detect visual features such that those visual features pertaining to the objects of interest are more heavily weighted than those visual features that pertain to irrelevant or unreliable portions of the image.

In some implementations, visual features are weighted for images in a searchable database. In other implementations training data is obtained and may be used in weighting visual features in a query image and, alternatively, in searchable database images.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

To detect features in an image, several approaches extract a plurality of local regions (or patches) and/or keypoints from the image and then evaluate each to determine whether they constitute one or more visual features. Feature detection may be performed using, for example, the regular grid method in which the image is evenly segmented horizontally and vertically to define local regions (with little regard for information from the image itself) and then interest point detectors identify salient (relevant and recognizable) visual features (or "interest points") such as edges, corners, and blobs in each region using techniques that may employ random sampling, segmentation (e.g., a normalized cut), and other processes known and appreciated by those of skill in the art. For example, the Difference of Gaussians (DoG) keypoint detector detects a keypoint and then defines a region (usually a square) corresponding to and centered on a keypoint, and this keypoint region is then analyzed to determine the scale and rotation angle of the keypoint region—information which will be used in computing a feature descriptor. The Scale-Invariant Feature Transform (SIFT) algorithm can be used to identify distinctive points in an image's regions that are invariant to location, scale, and rotation, and thus remain consistent among different regions of the same image as well as among different images. Another approach is the Maximally Stable Extremal Regions (MSER) methodology which detects only affine-covariant stable elliptical regions in the image having relatively high repeatability and distinctness, and the interest point detector determines the scope, rotation, and/or affine variation of the given regions for each keypoint—information that is used to compute a feature descriptor corresponding to each region.

A feature detection system may use one or more feature detection techniques (in parallel or in combination) to identify salient visual features. Then, after feature detection is completed and the salient visual features are identified, feature descriptors for each detected feature (or, in some implementations, for a subset of detected regions) are abstracted from the results and represented as a group of unordered vectors (each a "vector abstraction") pertaining to intensity, rotation, scale and/or affine variations corresponding to each detected feature in the image.

After feature detection and feature description are completed, each feature descriptor is quantized into one or more visual words. The quantization of feature descriptors (which are vectors) to visual words can be based on either a reference collection of known visual words (or "visual word dictionary") or, in certain implementations, developed concurrently with a reference collection. A single visual word may be used to represent several similar regions within the image (for those regions that are roughly equivalent and seemingly repeated in the image), and the image can then be represented as a histogram of the visual words in the image. Moreover, each visual word in the histogram may be weighted using, for example, term frequency/inverse document frequency (TFIDF or tf-idf) weighting that mathematically evaluates the importance of a visual word to its image and/or with regard to a collection of images.

It should be noted that while some basic approaches to quantifying an image (based on the visual words that comprise the image) effectively ignore the spatial relationships among the different identified regions in the image, spatial relationships may be useful in properly representing certain images for comparison to achieve higher quality search results; consequently, there are also other image-quantifying methodologies that incorporate spatial information in the results. For generative models, for example, the relative positions of visual words in an image may be taken into account. Similarly, for discriminative models a spatial pyramid match may be used to partition the image into increasingly finer sub-regions and compute histograms of local features inside each sub-region. Other techniques are also available to account for view point invariance and scale invariance, as well as object segmentation and localization. All of these methodologies strive for improved level of efficiency and accuracy in identifying and cataloging the many visual features that can be found in an image.

Using images quantized based on its visual features as described above, a query image can then be compared to a retrieved database image to assess the level of similarity. For example, given a query image Q and a set of detected interest points D(Q), descriptors f(x) can be computed for every detected interest point x that is a member of D(Q). Similarly, given a database image I and a set of detected interest points D(I), descriptors f(y) can be computed for every detected interest point y that is a member of D(I). The similarity Sim(Q; I) between Q and I is then computed. Typically Sim(Q; I) takes the following form:

$$Sim(Q, I) = \sum_{x \in D(Q)} \sum_{y \in D(I)} s(x, y \mid D(Q), D(I)) \quad (1)$$

where s is some matching score between x and y, in the descriptor space of f, given D(Q) and D(I). Typically there is also a normalization term Z such that $$Sim(Q, I) = \frac{1}{Z} \sum_{x \in D(Q)} \sum_{y \in D(I)} s(x, y \mid D(Q), D(I)) \quad (2)$$

but, for simplicity and without loss of generality, Z has been dropped throughout this disclosure. Also, the initial set of candidates may be generated by using a quantizer q for descriptor f and tf-idf scoring, specifically, $$s(x,y|D(Q),D(I))=[q(x)=q(y)] \cdot idf(q(y)) \quad (3)$$

Here q(x) maps the descriptor of the interest point to an integer that is the index to the closest visual word in a precomputed vocabulary (or dictionary) of visual words. This "mapping" can be obtained, for example, by kmeans clustering of the feature descriptors. [q(x)=q(y)] is the indicator function of whether q(x) equals q(y), that is, whether x and y are quantized to the same visual word. And although the normalization term Z for Sim(Q; I) is not included, Z can be the product of the L2 norms of the idf-weighted term frequency vectors of Q and I. One feature of quantization is that the index for all the database images can be inverted such that efficient retrieval of the small portion of images that have at least one match is possible.

After the initial set of candidate images from the image database is retrieved, ranking these images can be fine tuned by employing more sophisticated similarity comparisons (including those that may be practical only for smaller images sets). In some cases the similarity may take the same form as Equation (1). For example, the candidates may be further re-ranked using spatial verification, in which case the similarity s is computed by first estimating a transformation T from D(Q) to D(I), and then returning 1 if x and y matches under T or returning 0 if otherwise. Nevertheless, many visual features detected in an image are often not reliable or are irrelevant to the objects of interest found in an image, and the inclusion of such non-relevant visual features may reduce retrieval performance.

For implementations disclosed herein, higher quality image search results are obtained by providing weights to visual features to emphasize features corresponding to objects of interest while simultaneously deemphasizing irrelevant or inconsistent features that lead to poor search results. In order to minimize the impact of visual features that are unreliable or irrelevant with respect to the objects of interest in the image, context-dependent weights are provided to detect visual features such that those visual features pertaining to the objects of interest are more heavily weighted than those visual features that pertain to irrelevant or unreliable portions of the image. Visual features may be weighted for images in a searchable database. Training data may be obtained and used in weighting visual features in a query image and, alternatively, in searchable database images.

Figure 1:
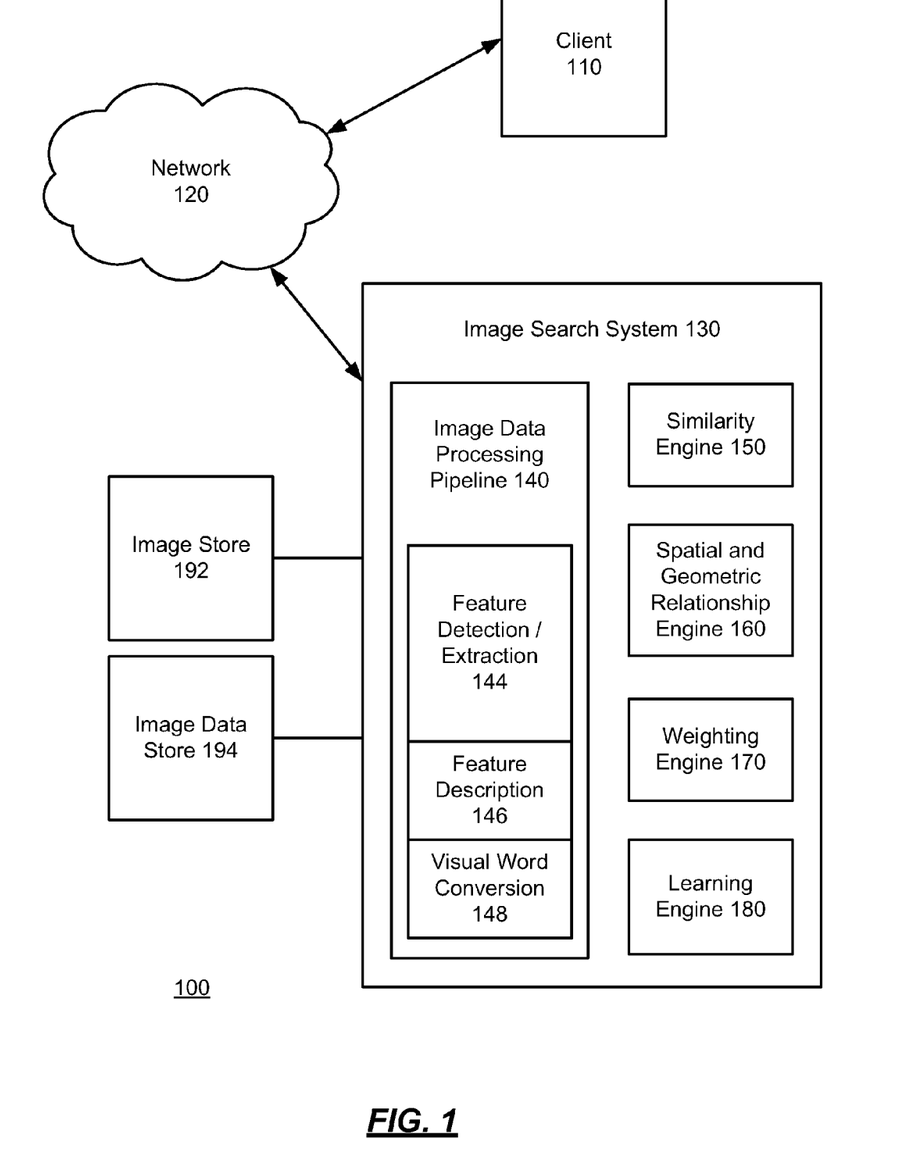
FIG. 1 shows an example of a computing environment in which aspects and implementations may be potentially exploited.

FIG. 1 is an illustration of an exemplary environment 100 for image retrieval. The environment may include a client 110. The client 110 may be configured to communicate with an image search system 130 through a network 120. The network 120 may be a variety of network types including the public switched telephone network (PSTN), a cellular telephone network, and a packet switched network (e.g., the Internet). While the client 110 and the image search system 130 are illustrated as being connected by the network 120, in some implementations it is contemplated that the client 110 and the image search system 130 are directly connected to each other or even executed by the same computing system.

Figure 6:
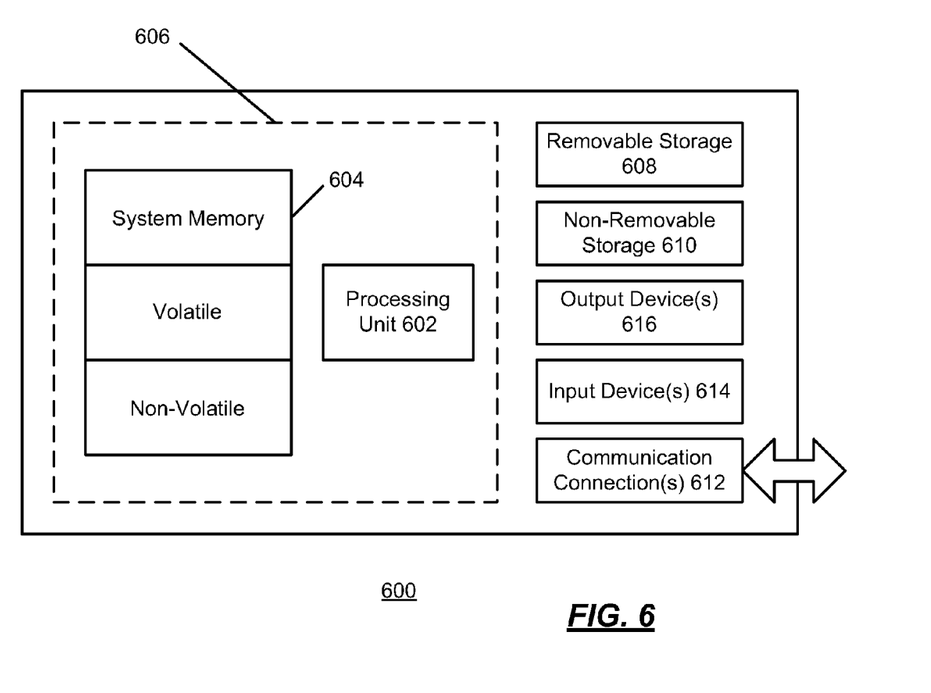
FIG. 6 shows an exemplary computing environment.

In some implementations, the client 110 may include a desktop personal computer, workstation, laptop, smartphone, PDA, cell phone, or any WAP-enabled device or any other computing device capable of interfacing directly or indirectly with the network 120 such as a computing device 600 illustrated in FIG. 6. The client 110 may run an HTTP client, e.g., a browsing program, such as MICROSOFT INTERNET EXPLORER or other browser, or a WAP-enabled browser in the case of a cell phone, PDA or other wireless device, or the like, allowing a user of the client 110 to access information available to it at the image search system 130 or to provide information to the image search system 130. Other applications may also be used by the client 110 to access or provide information to the image search system 130, for example. In some implementations, the image search system 130 may be implemented using one or more general purpose computing systems such as the computing device 600 illustrated in FIG. 6.

In some implementations, the image search system 130 may receive a query image from a user of the client 110 and search a corpus of database images (or any corpus of searchable images) to find matching images for the query image. The matching images may then be presented or identified to the user who submitted the query image. The matching images may comprise one or more images from an image store 192. The image store 192 may store images received or collected from one or more users. For example, the image store 192 may store images collected from the Internet. While the image store 192 is illustrated as being directly connected to the image search system 130, it is contemplated that the image store 192 may be connected to the image store 192 via the network 120 or integrated directly into the image search system 130.

The image search system 130 may process the images from the image store 192 to generate image data which, in turn, is stored in the image data store 194. In some implementations, the image data may be visual words generated from visual features detected in various regions of the images from the image store. As described, a drawback of conventional methods for using visual words in image searching is that many visual features detected in an image—whether a query image or a database image—are often unreliable or irrelevant to the objects of interest found in an image, and the inclusion of such non-relevant visual features may reduce retrieval performance using visual words that are in part derived from these visual features.

In some implementations, the image search system 130 may include an image data processing pipeline 140 to process an image into visual words. This image data processing pipeline may comprise one or more components such as: (a) a feature detection and extraction component 144 for identifying salient (relevant and recognizable) visual features such as edges, corners, and blobs in the image; (b) a feature description component 146 for abstracting from the visual features a group of feature descriptors, that is, unordered vectors pertaining to intensity, rotation, scale and/or affine variations for each detected visual feature in the image (each a "vector abstraction"); (c) a visual word conversion component 148 for quantizing each feature descriptor into a visual word using a visual word dictionary such that the image can then be represented as, for example, a histogram analysis of the number of times each visual word occurs in the image.

In some implementations, the image search system 130 may also include a similarity engine 150 that takes a query image and compares it to a retrieved database image to assess the level of similarity between the two. The image search system 130 may also include a spatial and geometric relationship engine 160 that accounts for the spatial relationships among the different identified regions and/or points in the image. The image search system 130 may further include a weighting engine 170 for providing weights to visual features in an image in order to emphasize certain features corresponding to objects of interest while simultaneously deemphasizing irrelevant or inconsistent features that lead to poor search results. For some implementations, the image search system 130 may also include a learning engine 180 for obtaining training data that may be used in weighting visual features in a query image and, alternatively, in searchable database images. The learning engine 180 may use discriminative modeling which, as known and appreciated by those of skill in the art, pertains to a class of models used in machine learning for modeling the dependence of an unobserved variable y on an observed variable x such that, within a statistical framework, modeling is achieved with the conditional probability distribution $P(y|x)$ which can be used for predicting y from x. Alternately, the learning engine 180 may also use generative modeling which pertains to randomly generating observable data given some input parameters and a framework for calculating results.

Figure 2:
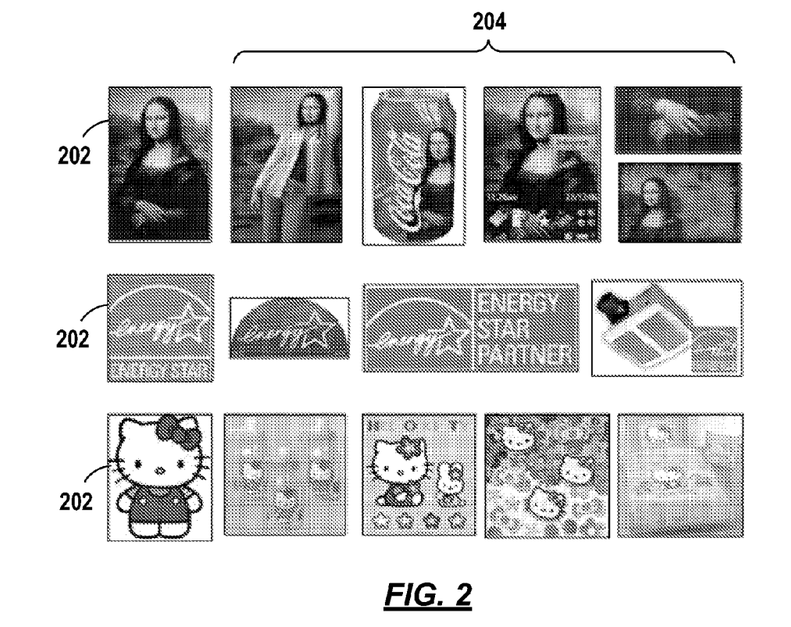
FIG. 2 is an illustration of two-dimensional searches including query images and corresponding candidate images.

FIG. 2 presents examples of two-dimensional searches including query images 202 (on the far left) and corresponding candidate images 204 (to the right of the query images 202) which are identified for the respective query images. As discussed earlier herein, the ability to accurately and efficiently perform database searches to identify stored images which are the same as or similar to a query image is growing in importance, especially with regard to two-dimensional image searching over the Internet and the World Wide Web. In this context, a search engine should identify two-dimensional candidate images based on a query image, even where the candidate images have differences in scale, cropping, different perspective, partial blocking (by another image), or limited duplication.

With regard to image retrieval and recognition, however, many visual features detected in an image are often not reliable or are irrelevant to the one or more objects of interest found in an image, and the inclusion of such non-relevant visual features may reduce retrieval performance. For example, given an image of a prominent foreground object such as a building, the visual features for a tree in the background of the image can degrade the performance of image recognition and retrieval. Similarly, some visual features from highly textured regions may not be repeatable—that is, such features may change with small disturbances due to camera viewpoint or image noise—and thus these visual features could also hinder image recognition and retrieval processes.

To address this situation, implementations are directed to weighting visual features in a query image in order to obtain higher quality search results, the implementations comprising a method for learning a function $\delta(x;Q) \geq 0$, where $\delta$ takes an interest point x that is a member of $D(Q)$ and the image Q, and outputs a score that indicates the importance of the interest point in the context of the image. This can be represented by rewriting Equation (1) using δ as follows:

$$Sim(Q, I) = \sum_{x \in D(Q)} \delta(x, Q) \sum_{y \in D(I)} s(x, y \mid D(Q), D(I)) \quad (4)$$

Figure 3:
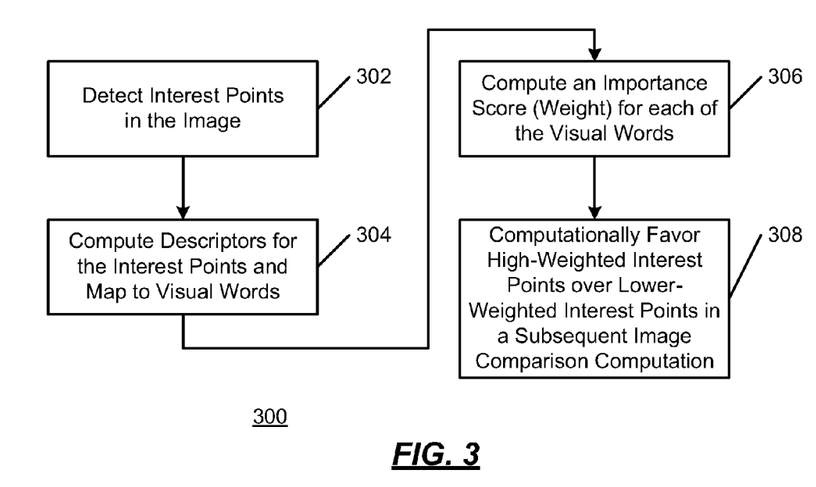
FIG. 3 is an operational flow diagram of an implementation of a method of weighting visual features for a given image.

FIG. 3 is an operational flow diagram for a method 300 of weighting visual features for a given image of any kind. At 302, a set of interest points is detected for the image using one or more of the known methodologies for detecting interest points. At 304, descriptors are computed and quantified for each of the detected interest points such that each descriptor can be mapped to a specific visual word in a predefined index ("vocabulary" or "dictionary") of visual words, again using one or more known methods for computing and quantifying descriptors. At 306, an importance score (or "weight") is then computed for each detected interest point in the image using any of the variety of methodologies discussed later herein, and including a method for providing predefined weights to the visual words in the index. At 308, the relatively higher-weighted interest points are computationally favored—and/or the lower-weighted interest points (such as those below a predetermined threshold weight) are computationally disfavored—in subsequent image comparison operations.

In some implementations, δ uses global statistics from Q, for example, GIST results in some implementations and spatial pyramid histograms from a different dictionary in other implementations. In some implementations, δ may also use statistics from the local neighborhood of x as well as the geometry of x, that is, δ(x;Q)=δ(L(x);G(Q)) where L(x) is a vector that represents some statistics of a local neighborhood and G(Q) is a vector of some global statistics of Q. Moreover, for certain implementations where a lower threshold might be used to generate large D(Q) and D(I) to provide broad coverage of potentially good interest points, δ may be used to down-weight or eliminate some (or many) of the relatively less-valuable interest points.

Figure 4:
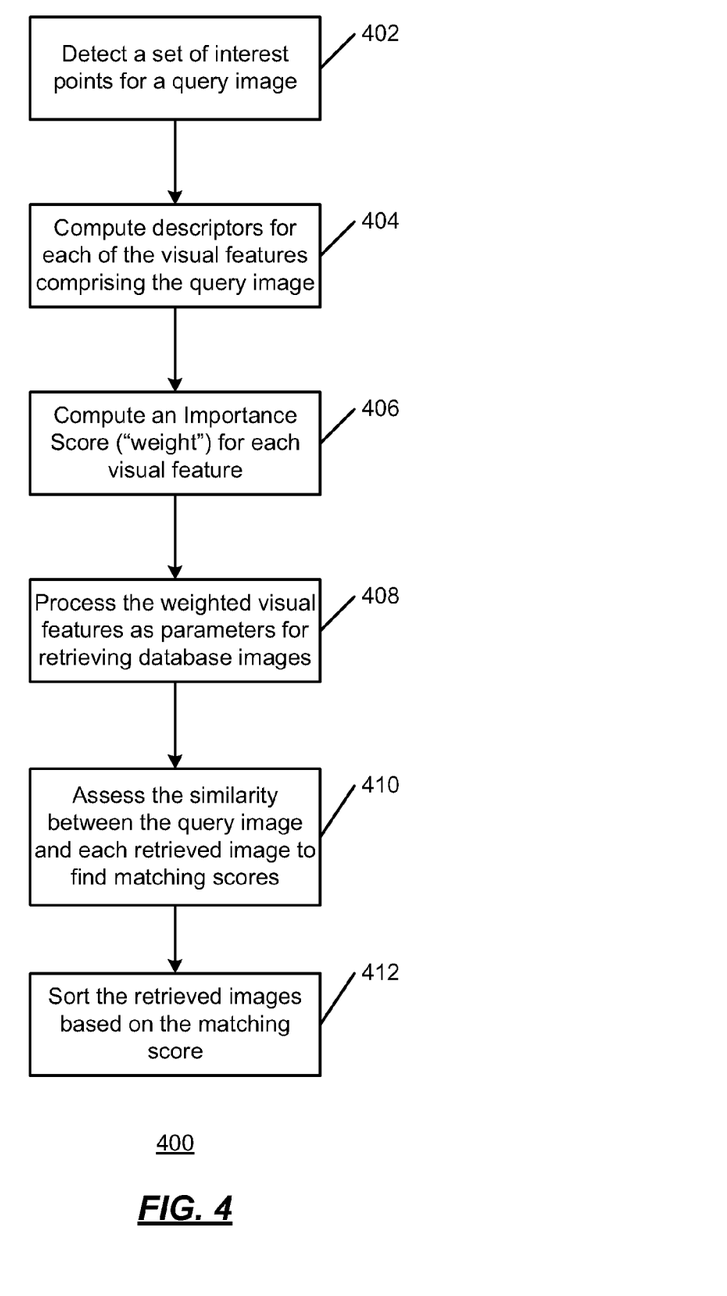
FIG. 4 is an operational flow diagram of an implementation of a method for searching a database of images for a set of retrieved images given a query image.

FIG. 4 is an operational flow diagram of a method 400 for searching a database of images for a set of retrieved images given a query image with weighted visual words. The method 400 comprises at 402 detecting a set of interest points for the query image. At 404, descriptors are computed and quantified for each of the visual features that comprise the interest points in the query image. At 406, an importance score (or "weight") is computed for each visual feature in the image using any of the variety of methodologies discussed later herein.

At 408, the weighted visual features are processed as retrieval parameters for identifying and retrieving candidate images from the retrieval database. Then, for each retrieved image, at 410, the similarity between the query image and the retrieved image is computed, normalized, and quantified as a matching score representing the strength of the match between the two images. At step 412, the retrieved images are sorted and presented in order based on the strength of the match.

Implementations may utilize a basic weighting approach such that $\delta(x)=w_{q(x)}$, where $w_i$, i=1 . . . N is the weight for visual word i. These implementations exploit the fact that each interest point is quantized to a visual word that has associated with it a constant weight $w_i$ and a simple lookup is all that is used to learn the weights $w_i$, i=1, . . . , N.

Other implementations may instead use a contextual weighting approach such that $\delta(x)=\beta_{q(x)}\cdot(L(x);G(Q))$, where $\beta_i$, i=1 . . . N is a vector associated with visual word i and (L(x);G(Q)) is the concatenated vector of local context L(x) and global context G(Q). Here can be determined the vectors $\beta_i$, i=1, . . . , N. Of course, a potential issue is that there may be hundreds of thousands of visual words and the context vector is high dimensional, which would thus entail a very large number of parameters that would need to be learned. Some implementations may address this issue by performing a dimensionality reduction of the context vector, while other implementations might instead employ regularization in learning. Certain implementations might also employ a smoothness constraint such that similar visual words have similar β. For example, the visual words might be clustered into groups and forced to share the same β, while other implementations might add constraints such that the difference between the β of a visual word and its k closest neighbors is small—an approach that can also apply to the basic weighting with a very large vocabulary.

Additional implementations are directed to methods of weighting visual features for images in a searchable database, thereby enabling these images to be represented by fewer interest points and simplifying the database index. Specifically, a method may learn a δ' such that Equation (1) becomes:

$$Sim(Q, I) = \sum_{x \in D(Q)} \sum_{y \in D(I)} \delta'(y, I) s(x, y \mid D(Q), D(I)) \quad (5)$$

Figure 5:
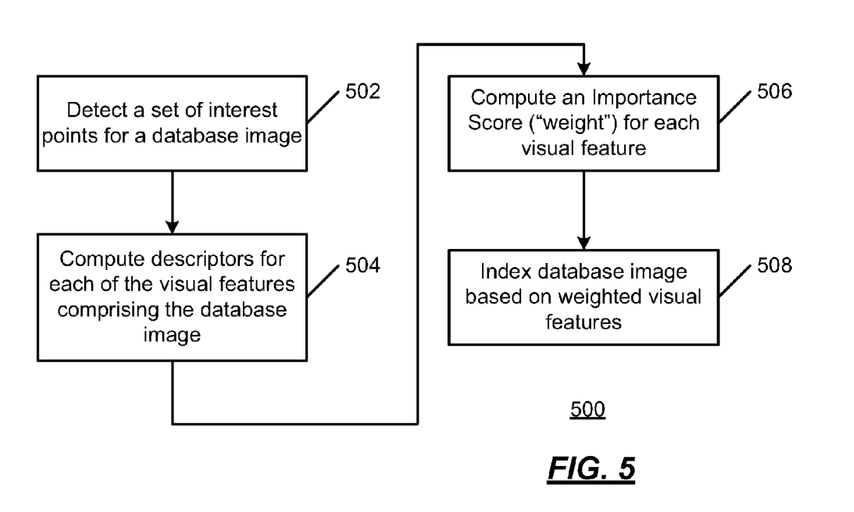
FIG. 5 is an operational flow diagram of an implementation of a method for indexing a database of images with weighted visual features.

FIG. 5 is an operational flow diagram of a method 500 for indexing a database of images with weighted visual features. For each image from a group of images maintained in a retrieval database, a set of interest points is detected at 502. At 504, descriptors are computed and quantified for each of the visual features that comprise the interest points. At 506, an importance score is computed for each of the visual features. At 508, the database image is indexed based on these descriptors to enable the efficient retrieval of that image, such that only a small but relevant subset of the database images that have one or more descriptors in common is based on provided retrieval parameters.

For other implementations, the method learns both a δ and a δ' such that Equation (1) becomes:

$$Sim(Q, I) = \sum_{x \in D(Q)} \delta(x, Q) \sum_{y \in D(I)} \delta'(y, I) s(x, y \mid D(Q), D(I)) \quad (6)$$

Moreover, it is anticipated that in some implementations the learning alternates between δ and δ'. For example, if δ is fixed, learning δ' will take a similar form due to the symmetry.

Implementations may also feature processing training data to weight visual features in a query image and, alternatively, for processing training data to weight visual features in searchable database images. With regard to query images, and given training examples $(Q_i, I^+_i, I^-_i)$, i=1 . . . N, that is, a query Q, a relevant image $I^+$, and an irrelevant image $I^-$ (together a "triplet of images"), the techniques may find δ such that Min. $R(\delta)+C\Sigma_i \xi_i$ s.t. $Sim(Q_i, I_i^+) - Sim(Q_i, I_i^-) \geq 1 - \xi_i, \forall i$ $\delta \geq 0$ $\xi_i \geq 0, \forall i$ \quad (7)

where R is some regularizer of δ. For implementations using basic weighting δ, $$R(\delta) = \sum_{Q} \sum_{x \in D(Q)} w_q(x) \quad (8)$$

is used, where Q runs through all query images in training such that this approach minimizes the number of interest points used for each Q. An additional constraint $w_i \geq 0$ may be used. For implementations that use contextual weighting, $$R(\delta) = \sum_{Q} \sum_{x \in D(Q)} |\beta_q(x)| \quad (9)$$

and, for some implementations, $\beta_i$ is kept element-wise non-negative for $\beta_i = 1 \ldots N$. Because this regularization is L1 like, additional terms can be added for regularization such as smoothness of the parameters for similar visual words. Similarly, a subset of these implementations may also add L2 norm of the parameters to prevent very large values. The optimization problem is convex, that is, the objective and the constraints are all linear or convex, and may be solved using (stochastic) sub-gradient descent.

FIG. 6 shows an exemplary computing environment in which example implementations and aspects may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of weighting visual features in an image, the method comprising:
   detecting, by a computing device, a plurality of visual features for the image;
   determining, by the computing device, a plurality of descriptors based on the plurality of visual features;

determining, by the computing device, a visual word corresponding to each of the plurality of descriptors by quantizing each descriptor using a collection of known visual words;

determining, by the computing device, a weight for each of the plurality of descriptors, wherein determining a weight for a descriptor comprises calculating the weight based on a vector associated with the visual word corresponding to the descriptor and a concatenated vector of a local context and a global context and based on a difference between the vector associated with the visual word corresponding to the descriptor and vectors associated with visual words corresponding to one or more descriptors of the plurality of descriptors that are neighbors of the descriptor; and adding the image to a database of images by the computing device, wherein the database of images is indexed based on the weighted descriptors.

2. The method of claim 1, wherein the image comprises a query image or a database image.

3. The method of claim 1, further comprising computationally favoring at least one higher-weighted descriptor over a lower-weighted descriptor in an image comparison operation.

4. The method of claim 1, further comprising determining a threshold weight, and eliminating at least one descriptor having a weight below the threshold.

5. The method of claim 1, wherein a weight assigned to at least one visual feature from among the plurality of visual features is derived from a predefined weighting for a visual word corresponding to the visual feature.

6. The method of claim 1, wherein a weight is further calculated using at least one global statistic from the image.

7. The method of claim 1, wherein a weight is further calculated using at least one local statistic from a region corresponding to a visual feature from among the plurality of visual features in the image to which the weight pertains.

8. The method of claim 1, wherein a weight is further calculated using at least one geometric relationship based on a visual feature from among the plurality of visual features in the image to which the weight pertains.

9. The method of claim 1, wherein a weight is learned from an optimization process using at least one triplet of images comprising a query image, a relevant image, and an irrelevant image.

10. The method of claim 1, further comprising determining a histogram of the determined visual words.

11. The method of claim 1, further comprising reducing a dimensionality of the concatenated vector prior to calculating the weight based on the vector associated with the visual word corresponding to the descriptor and the concatenated vector.

12. The method of claim 1, wherein the vector associated with the visual word is a feature vector, and further comprising clustering the visual words into a plurality of clusters based on the feature vectors associated with the visual words, and for each cluster of the plurality of clusters, associating a same feature vector to each visual word in the cluster.

13. A method of searching for images in a corpus of searchable images based on a query image, the method comprising:

detecting, by a computing device, a plurality of visual features for the query image;

computing, by the computing device, a plurality of descriptors based on the plurality of visual features;

computing, by the computing device, a visual word corresponding to each of the plurality of descriptors by quantizing each descriptor using a collection of known visual words;

computing, by the computing device, a weight for each descriptor among the plurality of descriptors to produce a plurality of weighted descriptors, wherein computing a weight for a descriptor comprises calculating the weight based on a vector associated with the visual word corresponding to the descriptor and a concatenated vector of a local context and a global context and based on a difference between the vector associated with the visual word corresponding to the descriptor and vectors associated with visual words corresponding to one or more descriptors of the plurality of descriptors that are neighbors of the descriptor;

utilizing the plurality of descriptors to retrieve a plurality of candidate images from the corpus of searchable images based on the query image, by the computing device, wherein the images of the corpus of searchable images are indexed by the weighted descriptors;

ranking the plurality of candidate images using spatial verification; and sorting and presenting the ranked plurality of candidate images based on a strength of the match between each candidate image and the query image by the computing device.

14. The method of claim 13, further comprising eliminating a subset of descriptors from among the plurality of descriptors based on the weights of the descriptors in the subset of descriptors.

15. The method of claim 13, wherein the weight is further calculated using a basic weighting approach based on a constant weight given for a corresponding normalized visual word.

16. An image search system comprising a computing device, the computing device comprising:

a feature detection component for detecting at least one visual feature in an image;

a feature description component for abstracting from the at least one visual feature a plurality of vectors pertaining to at least one vector abstraction from among the following vector abstractions: intensity, rotation, and scale;

a visual word conversion component for quantizing the at least one resulting vector into at least one visual word using a collection of known visual words;

a weighting engine for weighting the at least one visual word by calculating a weight based on a vector associated with the visual word and a concatenated vector of a local context and a global context and based on a difference between the vector associated with the visual word and vectors associated with visual words that are neighbors of the at least one visual word; and an image store for storing the image, wherein a plurality of images in the image store are indexed based on the weighted visual words.

17. The system of claim 16, further comprising a spatial and geometric relationship engine for quantifying the spatial relationships between at least two visual features extracted from the image.

18. The system of claim 16, further comprising a similarity engine for comparing a query image to a retrieved database image to assess the level of similarity between the query image and the retrieved database image.

19. The system of claim 16, further comprising a learning engine for obtaining training data that may be used in weighting a plurality of visual features in the image.

20. The system of claim 19, wherein the learning engine uses an optimization process using at least one triplet of images comprising a query image, a relevant image, and an irrelevant image.

* * * * *